Sept. 15, 1953  J. H. MALLINSON ET AL  2,652,202
HOMOGENIZING MILL
Filed Feb. 27, 1948

INVENTORS.
JOHN HESELTON MALLINSON
CHARLES JAMES GEYER, JR.
BY Thomas R. McNally Patented Sept. 15, 1953

2,652,202

UNITED STATES PATENT OFFICE 2,652,202

HOMOGENIZING MILL

John Heselton Mallinson, Front Royal, and Charles James Geyer, Jr., Cedarville, Va., assignors to American Viscose Corporation, Wilmington, Del., a corporation of Delaware Application February 27, 1948, Serial No. 11,647

8 Claims. (Cl. 241—255)

This invention relates to a process and a disintegrating machine for obtaining reduction of size of particles suspended in a fluid.

In many industrial processes in which liquids containing suspended solids or immiscible liquids are handled, fineness of the suspended material may materially affect the quality of final products, or the speed and cost of a manufacturing operation. For example, in extruding fine denier artificial filaments, the liquid to be extruded must be free of particles which might cause or contribute to the plugging of spinnerette orifices. Moreover, the presence of undissolved particles in a spinning liquid which readily pass through a spinnerette is objectionable since at any point along a filament at which such particles occur, the strength of the filament is reduced. When the liquid is a solvent for solid material suspended therein, complete elimination of the suspended material, except for impurities, is possible. The impurities when present to a minor extent in particle form, may be rendered unobjectionable by sufficient reduction in fineness. For example, in the manufacture of viscose rayon, the spinning liquid is prepared by dissolving cellulose xanthate in aqueous caustic soda solution. In spite of the thorough mixing received by these materials in conventional practice, the xanthate solution contains small particles of undissolved material ranging in size from those easily visible to those of colloidal proportions. Hence, the usual manufacturing practice of viscose yarn requires the passage of cellulose xanthate solution through three or four stages of filter presses to remove such particulate material before spinning the liquid. The extent and complexity of filtering equipment and the attention required in the operation thereof may be substantially reduced if the completeness of solution is such that the liquid contains practically no undissolved soluble material. Complete solution of fine undissolved particles is possible with continued mixing or mechanical agitation but is highly impractical in the conventional equipment heretofore used because of the time and energy required. Repeated filtration of the viscose solution is therefore resorted to in order that mixing periods may be held within practical limits.

It is an object of this invention to provide a disintegrating, mixing and homogenizing machine for treating liquid suspensions. Another object is to provide an apparatus capable of reducing the size of colloidal particles. A further object is to provide an improved method and apparatus for preparing cellulose xanthate solutions which substantially reduces the need for filtration equipment and operating labor therefor. Still another object is to effect savings of materials in processes such as in viscose rayon manufacturing wherein, by employing the invention, less caustic is needed to dissolve cellulose xanthate and less acid is thereafter needed to neutralize excess caustic. Other objects, features and advantages of the invention will be apparent from the drawing and the following description thereof.

In the drawing illustrative of the invention,

According to the invention, a mill is provided in which grinding, disintegrating, homogenizing and/or mixing are accomplished between cylindrical working surfaces of overlapping elements of a stator and a rotor without producing axial forces on working parts, by introducing the material to be treated into the clearance between the stator and rotor at a point axially midway of the working surfaces of the overlapping region.

Figure 1:
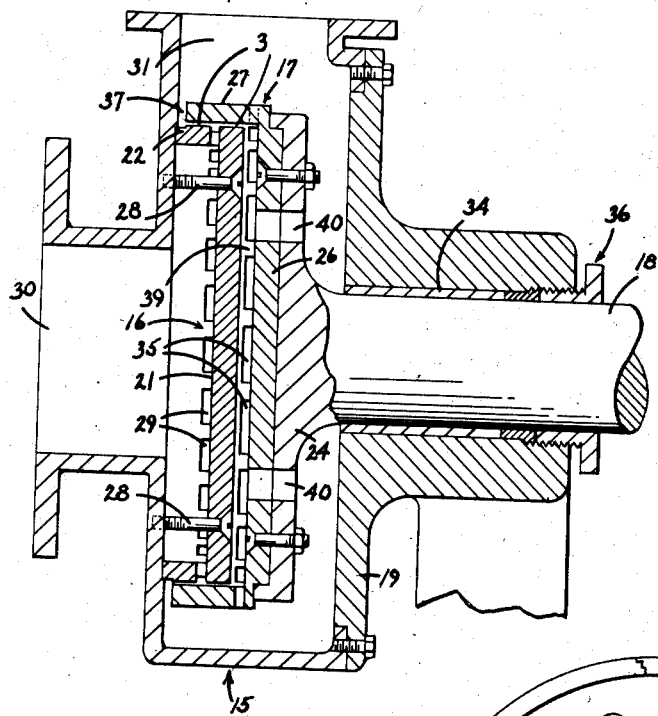
Figure 1 is an elevation partly in section of a colloid mill according to the invention.
Figures 2, 3:
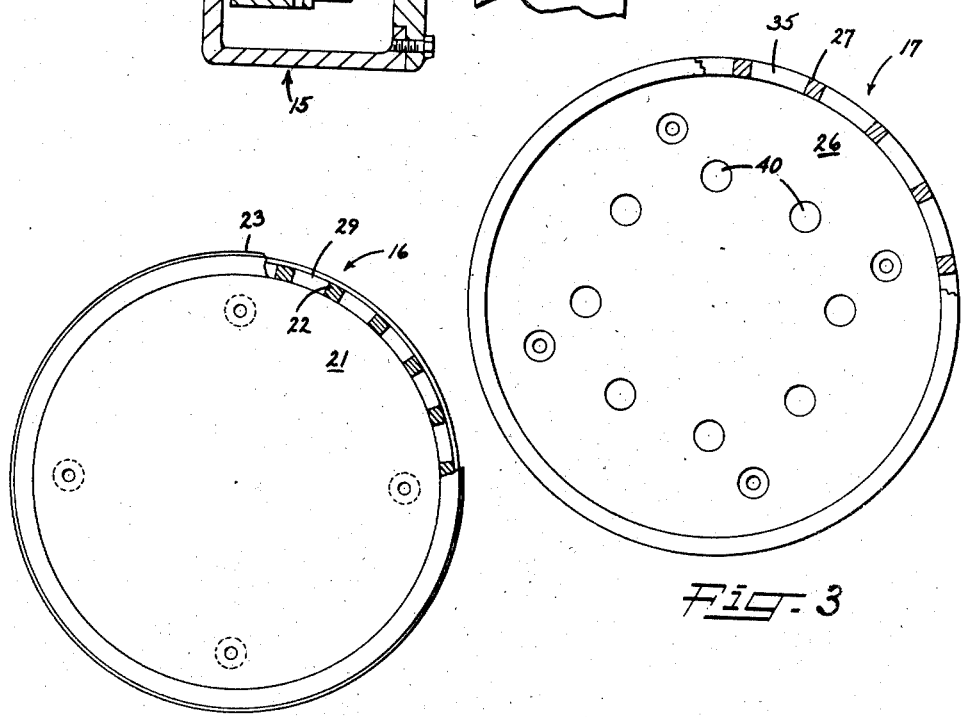
Figure 2 is an axial view of a stator shown in Figure 1.
Figure 3 is an axial view of a rotor shown in Figure 1.

In Figure 1, a mill is shown which comprises an outer housing 15 provided with a fluid inlet 30 and an outlet 31; a stator 16 (shown also in Figure 2) having a disc portion 21, and flange portion 22 with circumferentially spaced apertures 29 in the region of its juncture or attachment to the disc portion; a rotor 17 (shown also in Figure 3) comprising a disc element 26, and a flange element 27 provided also with circumferentially spaced apertures 35 in the region of juncture or attachment to the disc element 26; a drive shaft 18 ending in a flared radially extending supporting member 24 for the rotor 17. The housing 15 has a closure 19 having a bearing 34 for supporting the shaft 18. The rotor 17 is attached to member 24 in precise axial alignment with the stator 16 which is rigidly attached to one lateral wall of the housing 15.

Stator 16 is held in place by cap screws 28 to form, with a portion of the interior surface of the housing 15, a chamber contiguous with the inlet 30, which is fluid-tight except for the apertures 29. Fluids containing suspended material enter the chamber through the inlet and are carried into the clearance 3 between the inner surface of the rotor flange 27, and the outer cylindrical surface formed by the stator flange 22 and the stator disc 21. This clearance between the flanges will be well under 0.010 of an inch and preferably not greater than 0.004 of an inch. Clearances of 0.002 to 0.004 of an inch are preferred in the milling of viscose solutions. The overlapping portions of the rotor and stator define the clearance region 3 in which the milling is performed. The cylindrical work surface of the stator 16 includes the periphery of the disc portion 21 as well as a portion of the surface of the flange portion 22 extending from the disc portion to the shoulder 23. The work surface of the rotor 17 extends from the perforated or apertured portion to the outer edge of the flange element 27.

The working surfaces of the stator and the rotor may be smooth, or one or both surfaces may be roughened such as by a shot blast treatment. As the apertures 29 open in proximity to the middle portion of the working surface of the stator, the fluid suspension divides into streams which flow in axially opposite directions. The portion of the material flowing toward the left side of the clearance region 3 (referring to Figure 1) is discharged through an annular space 37 into the region within the housing 15 exterior of the rotor 17; the portion flowing toward the right side of the clearance region enters the radially outermost portion of space 39 separating the rotor disc and stator disc; from there it flows into the region exterior of rotor 17 through a plurality of apertures 35. Since it is desired to obtain approximately equal division in the flow of material to right and left from the stator apertures 29, the escape area from the clearance region for the left-flowing portion provided by the annular space 37 is approximately equal to that provided for the right-flowing portion by the rotor apertures 35. In the event of clogging or other restriction of the apertures 35 and passage for treated fluid material is inadequate, additional apertures 40 extending through the rotor disc 26 and rotor supporting shaft member 24, provide escape for material from space 39.

In order that the rotor 17 may rotate with minimum vibration at high speeds while maintaining uniform clearances with the stator of the order of 0.002 to 0.004 of an inch, the abutting surfaces of the rotor and the support member are machined with great accuracy with respect to axis of shaft 18. To prevent leaking from the mill along the shaft, a packing gland 36 is provided for the bearing 19.

The rate of material flow through the machine is dependent primarily upon pressure at the inlet and/or suction at the outlet. The degree and quality of milling performed is dependent also on the clearance setting and the speed of the rotor. Therefore, the performance of the mill at a certain clearance setting may be controlled by varying either or both the inlet pressure and the rotor speed. In the milling of some liquids, particularly those of high viscosity, a cooling means may be needed to maintain the mill at a desirable temperature. In that event, the outer housing of the mill may be provided with a jacket (not shown) through which to circulate a liquid coolant, or equipped with fins (not shown) adapted to receive a cooling air stream.

The mill herein described has particular utility in producing a colloidal solution from a slurry of sodium cellulose xanthate in an aqueous medium, and especially aqueous sodium hydroxide, as the xanthate comes from the churn at the completion of xanthation. As a departure from the usual practice wherein the slurry from the xanthation operation is subjected to the action of a mixer, or an attritor, or a combination of both, the slurry from the churn is passed through a mill of the type herein described. Instead of the usual mixture containing lumps and gels of undissolved xanthated cellulose up to one-eighth of an inch in thickness, a suspension is obtained which contains suspended colloidal particles of microscopic proportions which dissolve within ten minutes to an hour after leaving the mill. During this period the suspension may be gently agitated with stirring or recirculating if desired. The resulting viscose solution is substantially pure except for any incompletely dispersed solid impurities which may be removed, if desired, by filtration apparatus relatively small to that ordinarily employed in viscose preparation.

A satisfactory mill for processing a slurry of xanthated cellulose has been built having a stator with a cylindrical grinding surface 14.250 inches in diameter overlapping the grinding surface of a rotor by 1.75 inches at a clearance of 0.004 inch. The working surfaces of the rotor and the stator were roughened by a shot blast treatment with No. 40 grit. The mill is driven by a 30 H. P. electric motor. With rotor speed of approximately 875 R. P. M. and an inlet pressure of about 160 pounds per square inch, about 50 gallons per minute of a cellulose xanthate slurry are passed through the mill. The product of the mill has greatly improved filterability which increases appreciably after a holding period of half an hour. One pass through the mill produces a viscose solution which cannot be equaled in filterability by repeated passes through conventional mixer-attritor equipment. Although one pass of the viscose slurry through the mill may be considered adequate, two or more passes may be made; or, if desired, successive passes may be made through mills having successively reduced clearances. It was found that viscose solutions obtained after one pass through the mill, when tested on filters of standard area and composition, had greatly improved filterability over any similarly aged solutions prepared according to conventional practices, and a much lower gel count, when examined for the number of gels of undissolved xanthated cellulose per unit volume.

It is found that by subjecting viscose solution to the intense shearing and disintegrating action of a mill such as herein described, less carbon disulfide is necessary in xanthating alkali cellulose and complete solution of the xanthated cellulose may be obtained while using less sodium hydroxide. This is an important advantage, since in addition to savings in caustic, less acid is required for neutralization in the coagulation bath. With the acid consumption reduced, further economies are derived from reduction in the amount of steam, power and labor expended in the acid reclaim operation. It is roughly estimated, that the mill requires but sixteen percent of the power required for equipment such as an attritor, a cutter and a mixer, normally used to convert a slurry comprising xanthated cellulose and sodium hydroxide into an extrudable solution, while yielding a viscose solution of superior filterability. Since there is substantial flow of material through the mill, advantage may be taken of the fluid velocities at the inlet and outlet orifices to produce agitation in a mixing vessel. For example, the mill might be installed on the bottom or side of a viscose mixer or dissolving vessel.

The mill herein described is operated according to conditions and principles which are unorthodox in conventional homogenizing practice. Viscose solution, for example, is easily handled or transferred at fluid velocities in the range of one-tenth to five-tenths of a foot per second. Above this range of speeds, the energy required increases tremendously with increases in rate of transfer and is expended, principally, in raising the temperature of the liquid rather than increasing its kinetic energy. This consideration coupled with the belief by commercial colloid mill manufacturers that material to be milled must be fed slowly into the mill and retained in contact with the mill working surfaces for an appreciable period of time is responsible for the design of conventional mills. These mills have a low input rate and a high heat evolution resulting in temperature rises in the region of 15–18 degrees centigrade for viscose, and must be equipped with cooling systems. Moreover, the degree of homogenization performed is not as great or as uniform as that of the invention. However, it is found that in some viscose liquids, viscosity is reduced by increased rate of shear and such liquids may be advantageously handled in certain types of equipment wherein the liquid is forced between surfaces having a clearance on the order of a few thousandths of an inch. Viscose solutions and slurries of cellulose xanthate in aqueous sodium hydroxide solution respond in this manner to large shear forces so that when viscose is subjected to a shearing velocity of 3000 or more feet per minute extremely efficient homogenization is obtained. Shearing velocity is a composition of rates according to the formula:

$$C = \sqrt{A^2 + B^2}$$

wherein $A$ = viscose velocity in feet per minute due to supply pressure.
$B$ = rotational velocity of the shearing surface of the spinning rotor in feet per minute.
$C$ = shearing velocity of viscose in feet per minute.

By placing a liquid suspension in a high state of shear, homogenization may be accomplished with a fraction of one per cent of the power consumed when performed in the slow moving state inherent in conventional homogenization apparatus. The higher efficiency of this type of homogenization is well established by the observation, that, when the mill herein described was subjected to through-put rates in the range of 40 to 50 gallons per minute, the discharged liquid was only 1 to 1.5° C. warmer than that which entered the mill. The mill may be therefore easily operated without a cooling system. In conventional mills of much lower through-put capacity, a temperature rise in the range of 10 to 25° C. is normal and cooling for the exterior of the mill is usually provided.

In the method and apparatus described by the invention, intensity of shear is the controlling factor affecting the degree of homogenization; other factors, such as milling surface area, and duration of shear are relatively unimportant. Present information indicates that filterability of a viscose solution may be progressively increased with increased intensity of shear. While treating a cellulose xanthate slurry according to the invention shearing velocities in the range of 3000 to 18,000 feet per minute were found sufficient to produce efficient homogenization. However, velocities up to 60,000 to 70,000 feet per minute may be employed to obtain finer dispersions and more rapid through-put rates. It has been found, therefore, that liquid suspensions which lose their viscosity when subjected to large shear forces are most economically homogenized when subjected to these forces. The elements contributing to the intense shearing action developed by the invention include high feed pressure to the mill, very close spacing of the milling surfaces, ample inlet and outlet space within the mill adjacent the region in which milling or homogenizing is performed, and the relative rotational speed of the milling surfaces.

While the invention has been described particularly with regard to the making of a rayon spinning solution, it has broad applicability and its features and advantages will be recognized wherever it is desired to treat liquid suspensions to obtain extremely fine division of suspended materials. While a preferred embodiment has been shown, it is to be understood that changes and variations may be made without departing from the spirit and scope of the invention as defined by the appended claims.

We claim:

1. A mixing, disintegrating and homogenizing machine comprising a housing having an inlet port and an outlet port for fluid materials, a stator having a disc-portion and a circular flange-portion extending axially and concentrically with respect to the disc-portion into continuous engagement with an inner surface of the housing to substantially enclose a chamber between the housing and the stator, a rotor mounted in coaxial relationship with the stator having a perforated disc-portion in adjacent spaced relationship with the disc-portion of the stator, the rotor having a circular flange-portion extending in an axial direction in overlapping coaxial relationship with the flange-portion of the stator to form an annular clearance region, the flange-portion of the stator having ports extending from its inner surface into junction with the clearance region at points spaced along an outer circumference of the stator disposed approximately midway between the ends of the stator surface overlapped by the flange-portion of the rotor; said inlet port opening into the chamber, the housing enclosing a region surrounding the rotor and the stator in communication with the ends of the clearance region and the outlet port.

2. A machine for mixing and disintegrating colloidal and particulate materials comprising a housing having an inlet port and an outlet port, a stator fixed therewithin comprising a disc-like element and a cylindrical flange joined therewith to form a cylindrical surface, said flange extending axially from the element into engagement with an inner surface of the housing to form a substantially enclosed chamber, said inlet port opening into the chamber, the flange having circumferentially-spaced openings extending from the chamber to the axially middle portion of the outer cylindrical surface of the stator, a rotor having a disc-portion in spaced coaxial alignment with the element and having a cylindrical flange-portion which approximately overlaps the entire cylindrical surface of the stator with a clearance not more than 0.004 of an inch therefrom to provide a work region between said overlapping portions, the rotor having circumferentially-spaced openings in the region of attachment of the flange-portion to the disc-portion, said housing enclosing a region surrounding the stator and the rotor in communication with the end of said work region adjacent the end of the rotor flange, said openings of the rotor, and the outlet port.

3. A mixing, disintegrating and homogenizing machine for colloidal and particulate materials comprising a housing having an inlet port and an outlet port, a stator fixed therewithin comprising a disc-like element and a flange joined therewith to form an outer cylindrical surface, said flange engaging the inner surface of the housing to form a substantially enclosed chamber between the stator and the housing surface, said inlet port opening into the chamber, the flange having openings spaced along a circumference thereof and extending from the chamber to a portion of the outer cylindrical surface of the stator disposed approximately midway between the ends thereof, a rotor having a disc-portion in spaced coaxial alignment with the stator and having a flange-portion of which the inner surface is cylindrical and approximately overlaps the entire outer cylindrical surface of the stator at a spacing of not more than 0.004 of an inch therefrom to form an annular clearance region, said rotor having also openings spaced along a circumference occurring thereon near the juncture of its flange-portion with the disc-portion, said housing enclosing a region surrounding the stator and the rotor constituting a passageway connecting said openings of the rotor and the end of the clearance region nearest said inner surface of the housing with the outlet port.

4. A mixing, disintegrating and homogenizing machine for liquid comprising a housing having an inlet port and an outlet port, a stationary inner member enclosing a region for receiving a liquid material, the inlet port opening into said region, said member having an outer annular axially-extending peripheral surface, an outer rotatable member having an inner annular surface concentrically spaced with respect to the annular surface of the inner member in axially overlapping relationship therewith, said facing annular surfaces defining an annular clearance in which the particle disintegration is effected, a wall of the inner member having a plurality of apertures uniformly spaced along the annular surface of the inner member, said apertures extending from the liquid-receiving region to an annular middle zone of the clearance, said housing enclosing said members and a region disposed exteriorly of the members, the last-named region constituting a passageway connecting the ends of the annular clearance with the outer port, the rotatable member being open in a radially outward direction from the ends of the portion of its inner surface which extends in overlapping relationship with said surface of the stationary member for discharging material from the clearance to said last-named region.

5. A machine for disintegrating colloidal materials comprising a housing having an inlet port and an outlet port, a stator supported within the housing and having an external annular axially-extending surface, a rotor having an internal annular surface extending in concentric and overlapping relationship at close clearance with respect to said surface in the stator, said overlapping surfaces defining an annular clearance region, said inlet port extending through a wall of the housing and into a region enclosed by the stator, means defined wholly by stationary surfaces, stationary means for conducting colloidal material from the inlet port directly into a portion of the clearance region disposed approximately midway between the ends thereof, the housing enclosing a region disposed exteriorly of the stator and the rotor in communication with the outlet port and the ends of the clearance region, the rotor being open in a radially outward direction from the ends of the portion of said internal surface which extends in overlapping relationship with said surface of the stator for discharging material from the clearance region into the region disposed exteriorly of the stator and the rotor.

6. A machine for disintegrating colloidal materials comprising a housing having an inlet port and an outlet port, a rotor having an interior substantially cylindrical surface, a stator having a disc section spaced in an axial direction from an inner surface of the housing and an annular flange section extending from the disc section in an axial direction into engagement with said housing surface to enclose a region between the stator and the housing, said inlet port opening into said region between the housing and the stator, an outer cylindrical surface on the flange section extending in concentric and closely-spaced overlapping relationship with said surface of the rotor to provide an annular work region therebetween, the stator having a plurality of substantially uniformly spaced radial passageways extending radially therethrough from said enclosed region to the circumference of the cylindrical surface of the flange section approximately midway between the ends of that portion of said surface overlapped by the surface of the rotor, said housing enclosing a region disposed exteriorly of the stator and the rotor contiguous with both ends of the work region and the outlet port said rotor having openings extending radially outwardly from approximately a circumference of the cylindrical surface of the rotor defining an end of that portion of said surface which overlaps the flange section of the stator.

7. A machine for disintegrating colloidal materials comprising a stationary housing having a lateral wall and a peripheral wall, a disc-like stator having an outer flange having an external annular work surface and being rigidly attached to the lateral wall thereby providing a chamber between the stator and the lateral wall which is substantially completely surrounded by stationary walls, an inlet port extending through the lateral wall to the chamber for introducing material to be disintegrated into the chamber, a rotor within the housing having an outer flange provided with an internal annular work surface concentric with and overlapping the work surface of the stator with close clearance therebetween, the flange of the stator having a plurality of ports spaced along a circumference thereof disposed between the ends of the overlapped portion of the work surfaces of the stator and extending radially from the chamber, the flange of the rotor terminating a short distance from the wall of the housing to provide an annular space therebetween which is axially offset from said ports of the stator and is adapted to serve as an annular port for discharging the homogenized material from the clearance between the working spaces, ports in the flange of the rotor spaced along a circumference thereof and axially offset from the ports in the stator in a direction opposite to that of the offset of said annular port therefrom, means for rotatably supporting the rotor on the axis of said work surfaces, and an outlet port in the peripheral wall of the housing, said housing enclosing the stator and the rotor and a space therearound in communication with the outlet port, the annular port, and the ports of the rotor.

8. A machine for disintegrating colloidal materials comprising a stationary housing having a lateral wall and a peripheral wall, a disc-like stator having an outer flange having an external substantially cylindrical work surface and being rigidly attached to the lateral wall thereby providing a chamber between the stator and the lateral wall which is substantially completely surrounded by stationary walls, an inlet port extending through the lateral wall to the chamber for introducing a material to be disintegrated into the chamber, a rotor within the housing having an outer flange provided with an internal substantially cylindrical work surface concentric with and overlapping the work surface of the stator with close clearance therebetween, said stator having a plurality of ports spaced along a circumference thereof disposed midway of said surface thereof overlapped by the rotor, the ports extending from the chamber to the region between the work surfaces, the flange of the rotor terminating a short distance from the wall of the housing to provide an annular space therebetween which is axially offset from said ports of the stator and is adapted to serve as an annular port for discharging the homogenized material from the clearance between the work surfaces, the flange of the rotor having a plurality of ports extending therethrough and spaced along a circumference thereof, said ports in the rotor being axially offset from the ports in the stator in a direction opposite to that of the offset of said annular port therefrom, and an outlet port in the peripheral wall of the housing, said annular port between the rotor flange and the wall of the housing and the aggregate of the ports in the flange of the rotor being substantially equal in area measured along a common surface of revolution having said axis as its axis to provide escape passages of equal capacity adjacent both ends of the clearance between the work surfaces, the housing enclosing the stator, the rotor, and a region therearound constituting a passageway connecting the annular port and the ports in the flange of the stator.

JOHN HESELTON MALLINSON.
CHARLES JAMES GEYER, Jr.

References Cited in the file of this patent

UNITED STATES PATENTS

| Number | Name | Date |
|---|---|---|
| Re. 19,280 | Lilienfeld | Aug. 21, 1934 |
| 1,496,641 | Hurrell | June 3, 1924 |
| 1,587,063 | Austin | June 1, 1926 |
| 1,650,088 | Molin | Nov. 22, 1927 |
| 1,666,640 | Cunniff | Apr. 17, 1928 |
| 1,690,668 | China | Nov. 6, 1928 |
| 1,862,592 | Goth | June 14, 1932 |
| 2,076,594 | Richter | Apr. 13, 1937 |
| 2,092,992 | Thalman | Sept. 14, 1937 |
| 2,338,196 | Nash | Jan. 4, 1944 |
| 2,389,505 | Hall | Nov. 20, 1945 |
| 2,477,096 | Silcox | July 26, 1949 |

FOREIGN PATENTS

| Number | Country | Date |
|---|---|---|
| 203,402 | Great Britain | Sept. 10, 1923 |